A. F. SINDERMANN.
AUTOMOBILE SHIFTING LEVER LOCK.
APPLICATION FILED JULY 5, 1917.
1,258,821.
Patented Mar. 12, 1918.
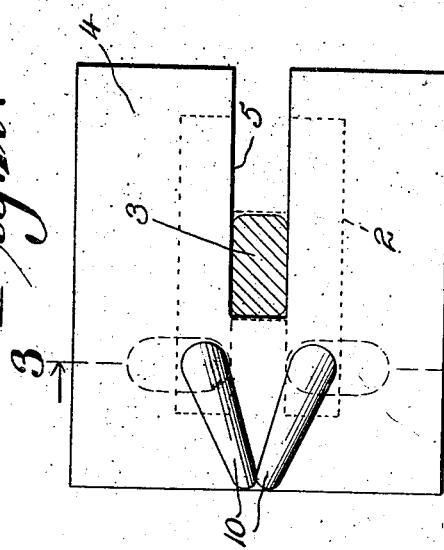
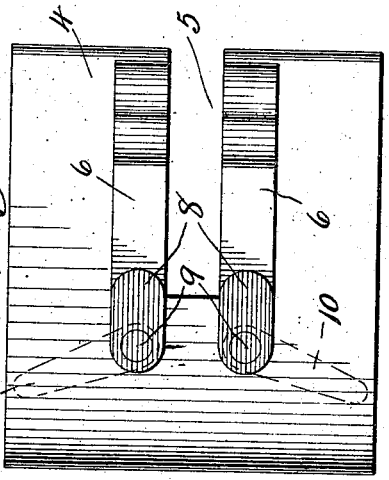
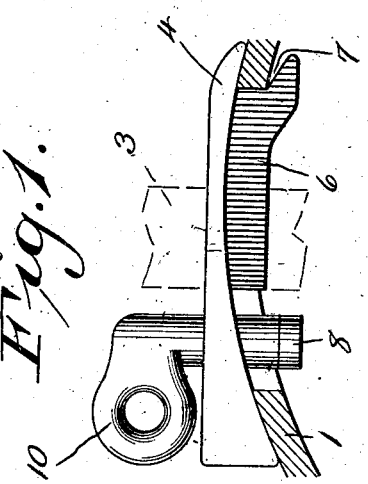
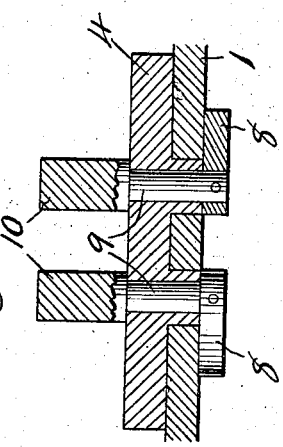

UNITED STATES PATENT OFFICE.

AUGUST F. SINDERMANN, OF MARATHON, WISCONSIN.

AUTOMOBILE-SHIFTING-LEVER LOCK.

1,258,821.   Specification of Letters Patent.   Patented Mar. 12, 1918.

Application filed July 5, 1917. Serial No. 178,640.

*To all whom it may concern:*

Be it known that I, AUGUST F. SINDERMANN, a citizen of the United States, and resident of Marathon, in the county of Marathon and State of Wisconsin, have invented certain new and useful Improvements in Automobile-Shifting-Lever Locks; and I do hereby declare that the following is a full, clear, and exact description thereof.

My invention relates to new and useful improvements in automobile locking means, more particularly to devices which are used to prevent unauthorized persons from using machines to which they are applied.

The principal object of the present invention is to provide a locking device which can be used in combination with the shifting lever of an automobile, either the clutch or the gear shifting lever, to lock the same in its neutral position.

An additional object is to provide a locking device which is particularly adapted for use in connection with shifting levers which operate in the so called H-plates and are used primarily for gear shifting.

A still further object is to provide a simply constructed device of relatively small size which can be easily attached to and detached from the parts to be locked thereby.

With the foregoing and other objects and advantages in view the invention resides in the novel features of construction, combination and arrangement of parts which will be hereinafter more particularly described and claimed, and shown in the drawing, wherein:

Figure 1 is a vertical section through a so-called H-plate in which a shifting lever is adapted to operate, my invention being applied to said H-plate and shown in a side elevational view.

Fig. 2 is a plan view of the parts which serve to lock the shifting lever, the latter being shown in section;

Fig. 3 is a vertical transverse section on the plane of the line 3—3 of Fig. 2; and Fig. 4 is a bottom plan view of the locking plate.

In the preferred embodiment of my inventions, as shown in the accompanying drawing, it will be seen that it is adapted to be disposed on the top of a plate 1 having a substantially H-shaped slot 2 therein. As usual with a machine carrying such a plate, the shifting lever 3 for changing the gears of the vehicle is disposed, when in neutral position, in the central portion of the slot or the cross bar of the H. The gears are out of mesh when the lever is in this position, and therefore it is desirable that it be locked in this position when it is necessary to keep the vehicle out of operation for any length of time.

From the several figures of the drawing, it will be seen that my invention comprises a locking plate 4 having its top substantially flat while its bottom is shaped to conform to the curvature or configuration of the H-plates, and that this locking plate has an open end slot 5 extending substantially through one-half the length thereof and mid-way the side edges. This slot receives the shifting lever 3 when the same is in neutral position, as shown in Fig. 2.

The plate 4 is held against movement relative to the parts with which it is associated by a pair of longitudinally extending ribs 6 which are disposed parallel to each other and have their adjacent edges substantially coincident with the longitudinal edges of the slot 5, and parts coöperating with said ribs to retain them in a stationary position within the long slots of the H-plate. One end of each rib is recessed as shown at 7 to provide keepers to receive portions of the H-plates when the ribs are disposed in the long slots thereof, as illustrated in Fig. 1.

The plate 4 is thereby prevented from shifting in one direction, movement in the other direction being prevented by plates 8 which are secured to the lower ends of spindles 9, which are journaled in openings in the plate 4 at the end thereof remote from the keepers 7. Although the plates 8 are shown as formed separately from the spindles 9, it is obvious that they might be also in the form of lugs and extended laterally therefrom. The length of the plates 8 is greater than the width of the long portions of the H-shaped slot, although their width is substantially similar thereto. By such an arrangement, it is obvious that by disposing the lugs longitudinally of the plate 4 before placing the same over the H-shaped slot, and then after the same is in position extending the former laterally of said slot, as in Fig. 2, that the plate will be locked in position to hold the shifting lever 3. In such a case, the keepers 7 are, of course, first engaged with the edges of the H-shaped plates.

After the parts have been assembled, as shown in Fig. 2, eyes 10 on the upper ends of the spindles 9 will be arranged in juxtaposition to receive the shank of a pad-lock or any other form of lock. The shifting lever will thus be positively locked against movement in any other direction, and since it is disposed in neutral position, the automobile will be rendered inoperative. In order to remove the locking plate 4, it is simply necessary to remove the pad-lock from the eyes 10 and move the same apart, as shown in Fig. 4, until the lugs 8 are alined with the ribs 6.

Various changes may be made in form and proportion and minor details of construction of the several parts of this invention to accommodate it for use on automobiles of various makes without departing from any of the principles of this invention, as set forth in the following claim.

I claim:—

The combination with a member having a pair of spaced parallel slots and a transverse slot connecting the other slots intermediate their ends, and a shiftable lever movable in said slots, of a locking plate having a slot extending inwardly from one edge, said slot being of a width substantially equal the distance between the parallel slots, a pair of parallel spaced ribs depending from one side of the plate, the adjacent sides of the ribs being coincident with the edges of the slots in said plate, said ribs each being of a width substantially equal to the width of each of the pairs of parallel slots adapted to be disposed therein, one end of each rib being recessed to provide a keeper for engagement with the ends of the parallel slots, whereby to prevent said plate from shifting, a pair of spindles disposed adjacent the other ends of the ribs, a lug fixed to the lower end of each spindle, said lugs being adapted to be disposed through the pair of parallel slots and engaged with the under side of the member, and an eye on the upper end of each spindle, said eyes being positioned substantially at right angles to said lugs.

In testimony that I claim the foregoing I have hereunto set my hand at Marathon, in the county of Marathon and State of Wisconsin.

AUGUST F. SINDERMANN.

Copies of this patent may be obtained for five cents each, by addressing the "Commissioner of Patents, Washington, D. C."